US 11,121,416 B2

(12) United States Patent
Guo et al.

(10) Patent No.: US 11,121,416 B2
(45) Date of Patent: Sep. 14, 2021

(54) ADSORPTION ASSEMBLY AND BATTERY (71) Applicant: NINGDE AMPEREX TECHNOLOGY LIMITED, Ningde (CN)

(72) Inventors: Qiang Guo, Ningde (CN); Yu Chen, Ningde (CN); Pei Han, Ningde (CN)

(73) Assignee: NINGDE AMPEREX TECHNOLOGY LIMITED, Fujian (CN)

(*) Notice: Subject to any disclaimer, the term of this patent is extended or adjusted under 35 U.S.C. 154(b) by 0 days.

(21) Appl. No.: 16/178,397

(22) Filed: Nov. 1, 2018

(65) Prior Publication Data
US 2020/0020993 A1 Jan. 16, 2020

(30) Foreign Application Priority Data

Jul. 13, 2018 (CN) .......................... 201810772074.5

(51) Int. Cl.
*H01M 10/52* (2006.01)
*B01D 53/04* (2006.01)
*B01D 53/22* (2006.01)
*B01D 71/26* (2006.01)
(Continued)

(52) U.S. Cl.
CPC ........ *H01M 10/52* (2013.01); *B01D 53/0407* (2013.01); *B01D 53/229* (2013.01);
(Continued)

(58) Field of Classification Search
CPC ............. H01M 10/52; H01M 8/04089; H01M 8/0662; H01M 8/0668; H01M 2/14;
(Continued)

(56) References Cited

U.S. PATENT DOCUMENTS

| 5,964,221 A | 10/1999 | McKenna |
| 2004/0151966 A1* | 8/2004 | Dahlgren ........... H01M 8/04119 429/410 |
| 2006/0177372 A1* | 8/2006 | Doshi ..................... C01B 3/384 423/652 |

(Continued)

FOREIGN PATENT DOCUMENTS

| CN | 102934278 A | 2/2013 |
| CN | 203225319 U | 10/2013 |

(Continued)

OTHER PUBLICATIONS

KR-101222377-B1 translation (Year: 2020).*
CN107611472A English machine translation (Year: 2020).*
CN 107611472 English machine translation (2) (Year: 2020).*

(Continued)

*Primary Examiner* — Ula C Ruddock
*Assistant Examiner* — Armindo Carvalho, Jr.
(74) *Attorney, Agent, or Firm* — Morgan, Lewis & Bockius LLP (57) ABSTRACT

An adsorption assembly and a battery are provided. The adsorption assembly includes: a housing including a gas permeable portion; and an adsorbent encapsulated by the housing. The adsorption assembly can effectively isolate the adsorbent from the external environment by providing the housing, thereby preventing the adsorption performance of the adsorbent from being affected, and the housing includes a gas permeable portion, which can make the produced gas in the external environment enter the housing and be effectively adsorbed by the adsorbent. In particular, when the adsorbent is used for a battery, especially a soft pack battery, the gas produced inside the battery can be effectively adsorbed to prevent liquid leakage of the battery seal caused by breakage of the battery seal by gas, improving reliability (Continued)

and safety of the battery and extending lifetime of the battery.

15 Claims, 6 Drawing Sheets (51) Int. Cl.
*B01D 71/36* (2006.01)
*H01M 50/30* (2021.01)
*H01M 50/392* (2021.01)

(52) U.S. Cl.
CPC ............ *B01D 71/26* (2013.01); *B01D 71/36* (2013.01); *H01M 50/392* (2021.01); *H01M 50/394* (2021.01); *B01D 2253/116* (2013.01); *B01D 2257/502* (2013.01); *B01D 2257/504* (2013.01)

(58) Field of Classification Search
CPC ...... H01M 2/34; H01M 10/525; H01M 10/42; H01M 50/392; H01M 50/394
See application file for complete search history.

(56) References Cited

U.S. PATENT DOCUMENTS

| 2009/0090245 | A1 | 4/2009 | Olszewski |
| 2013/0171483 | A1* | 7/2013 | Shibata ................. H01M 10/04 429/56 |

FOREIGN PATENT DOCUMENTS

| CN | 106058083 A | | 10/2016 | |
| CN | 106068576 A | | 11/2016 | |
| CN | 107611472 A | * | 1/2018 | |
| CN | 107611472 A | | 1/2018 | |
| JP | 2011258438 A | | 12/2011 | |
| KR | 101222377 B1 | * | 1/2013 | ............. H01M 2/02 |

OTHER PUBLICATIONS

Ningde Amperex Technology Limited, Extended European Search Report, EP19183850.7, dated Dec. 13, 2019, 6 pgs.
Office Action, CN201810772074.5, dated Sep. 3, 2020, 7 pgs.
Office Action, CN201811547628.8, dated Dec. 15, 2020, 11 pgs.
Office Action, CN201810772074.5, dated Jun. 22, 2021, 7 pgs.

* cited by examiner

ADSORPTION ASSEMBLY AND BATTERY

CROSS-REFERENCE TO RELATED APPLICATION

This application claims priority to and benefits of Chinese Patent Application Serial No. 201810772074.5, filed with the State Intellectual Property Office of P. R. China on Jul. 13, 2018, the content of which is incorporated herein by reference.

FIELD

The present disclosure relates to the field of electrochemistry, and in particular to an adsorption assembly and a battery.

BACKGROUND

At present, in order to reduce the production of gas inside a battery, the positive and negative electrode materials of the battery and the electrolyte system are often improved, making it difficult to produce gas. For an organic solvent system, the side reactions between the organic solvent and the positive or negative electrode materials of the battery are difficult to avoid, so the problem of gas production of the battery has not been effectively solved. In order to reduce the produced gas breaking through the aluminum plastic film package, it is necessary to improve the reliability of the battery package. However, due to the limitation of the material of the aluminum plastic film, a safe use of the battery cannot be achieved with the packaging capacity of the aluminum plastic film in a case of a large amount of gas production. Therefore, it is urgent to propose a feasible solution to solve the safety problem caused by gas production of the battery.

SUMMARY

Embodiments of the present disclosure seek to solve at least one of the problems existing in the related art to at least some extent. Therefore, an object of the present disclosure is to provide an adsorption assembly and a battery containing the same that can effectively adsorb the produced gas inside the battery, improving safety and reliability of the battery.

According to a first aspect of the present disclosure, an adsorption assembly is provided. According to embodiments of the present disclosure, the adsorption assembly includes an adsorbent, a housing encapsulating the adsorbent, in which the housing includes a gas permeable portion through which external gas and internal gas of the adsorption assembly are exchanged. The inventors have found that the adsorption assembly can effectively isolate the adsorbent from the external environment (such as an electrolyte when applied to a battery) by providing the housing, thereby preventing the adsorption performance of the adsorbent from being affected, and the housing includes a gas permeable portion, which can make the produced gas in the external environment enter the housing and be effectively adsorbed by the adsorbent. In particular, when the adsorbent is used for a battery, especially a soft pack battery, the gas produced inside the battery can be effectively adsorbed to prevent liquid leakage of the battery seal caused by breakage of the battery seal by gas, improving reliability and safety of the battery and extending lifetime of the battery.

According to embodiments of the present disclosure, the housing includes: a main housing member defining an opening, in which the gas permeable portion covers the opening.

According to embodiments of the present disclosure, the main housing member includes an electrolyte resistant material.

According to embodiments of the present disclosure, the electrolyte resistant material includes at least one selected from the group of polyethylene, polypropylene and polyethylene terephthalate.

According to embodiments of the present disclosure, the adsorbent is encapsulated by the gas permeable portion.

According to embodiments of the present disclosure, the housing has a shape of at least one selected from the group of a prism, a cylinder, a curved column, and a pocket.

According to embodiments of the present disclosure, the gas permeable portion includes a gas permeable membrane.

According to embodiments of the present disclosure, the gas permeable membrane has a thickness of 40 to 150 microns.

According to embodiments of the present disclosure, the gas permeable membrane satisfies at least one of the following conditions at a gas pressure of 7 KPa: an air flow rate is greater than or equal to 300 mL/min/cm$^2$; a hydrostatic pressure is greater than or equal to 90 KPa; an oleophobic level is greater than or equal to 7.

According to embodiments of the present disclosure, a material of the gas permeable membrane includes at least one of a modified polytetrafluoroethylene and a modified polyethylene.

According to embodiments of the present disclosure, the gas permeable membrane includes at least one of an expanded polytetrafluoroethylene microporous membrane and a stretched polyethylene microporous membrane.

According to embodiments of the present disclosure, a surface of the gas permeable membrane is provided with an adhesive layer.

According to embodiments of the present disclosure, the adsorbent is a molecular sieve capable of adsorbing carbon monoxide or carbon dioxide.

According to embodiments of the present disclosure, the adsorbent includes at least one selected from the group of a 5A calcium ion type molecular sieve, a lithium type molecular sieve, a 5× type molecular sieve, and a 13× type molecular sieve.

According to another aspect of the present disclosure, a battery is provided. According to embodiments of the present disclosure, the battery includes: a packaging film; a cell; the adsorption assembly as described above, in which the adsorption assembly is disposed on at least one side of the cell, and the cell and the adsorption assembly are encapsulated by the packaging film. The inventors have found that the gas produced inside the battery can be effectively adsorbed to prevent liquid leakage of the battery seal caused by breakage of the battery seal by gas, improving reliability and safety of the battery and extending lifetime of the battery. The battery has all the features and advantages of the adsorption assembly described above, and will not be repeated here.

DETAILED DESCRIPTION

Embodiments of the present disclosure are described in detail below. The embodiments described below are illustrative, and used to generally understand the present disclosure. The embodiments shall not be construed to limit the present disclosure. Where specific techniques or conditions are not indicated in the embodiments, they are carried out according to the techniques or conditions described in the literature in the art or in accordance with the product specifications. Any reagents or instruments that are not indicated by the manufacturer are commercially available.

According to a first aspect of the disclosure, an adsorption assembly is provided. According to embodiments of the present disclosure, referring to FIG. 1, the adsorption assembly includes a housing 1 including a gas permeable portion 12; an adsorbent 3, which is encapsulated by the housing 1. The inventors have found that the adsorption assembly can effectively isolate the adsorbent from the external environment (such as an electrolyte when applied to a battery) by providing the housing, thereby preventing the adsorption performance of the adsorbent from being affected, and the housing includes a gas permeable portion, which can make the produced gas in the external environment enter the housing and be effectively adsorbed by the adsorbent. In particular, when the adsorbent is used for a battery, especially a soft pack battery, the gas produced inside the battery can be effectively adsorbed to prevent liquid leakage of the battery seal caused by breakage of the battery seal by gas, improving reliability and safety of the battery and extending lifetime of the battery.

According to embodiments of the present disclosure, in order to ensure the performance of the adsorbent, a specific material for forming the housing includes an environment resistant material. For example, when the adsorbent is used for an ion battery, a material for forming the housing includes an electrolyte resistant material which for example includes but is not limited to at least one selected from the group of polyethylene, polypropylene, and polyethylene terephthalate. Thus, the adsorbent can be effectively isolated from the electrolyte to ensure that the adsorbent is not infiltrated by the electrolyte and the adsorption performance is not affected, and the adsorbent has a long lifetime.

Figure 3:
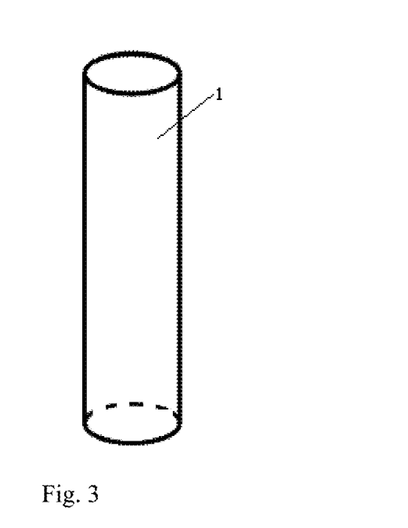
FIG. 3 is a schematic perspective view of an adsorption assembly according to another embodiment of the present disclosure.
Figure 4:
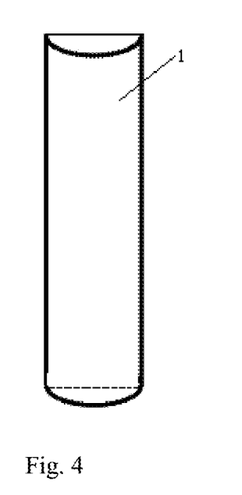
FIG. 4 is a schematic perspective view of an adsorption assembly according to another embodiment of the present disclosure.

According to embodiments of the present disclosure, the housing has a specific shape that is not particularly limited, and those skilled in the art can flexibly select the shape according to a demand of use, an application environment, and process conditions. In some embodiments of the present disclosure, referring to FIGS. 1 to 3, the shape of the housing 1 includes, but is not limited to, at least one selected from the group of a prism (referring to FIG. 1), a cylinder (referring to FIG. 3), a curved column (which refers to a column where at least a part of a surface is curved, referring to FIG. 4) and a pocket (referring to FIG. 2). Therefore, the adsorption assembly has a relatively large working area and a high adsorption efficiency of produced gas, and can be applied to various environments and various complicated structures, and the adsorption assembly has a wider application field.

According to embodiments of the present disclosure, the gas permeable portion on the housing may ensure that liquid in the external environment cannot enter the housing to infiltrate the adsorbent and affect the adsorption performance, and at the same time, the gas produced in the external environment can enter the housing and can be absorbed by the adsorbent. In some embodiments of the present disclosure, a part of the housing may be configured as a gas permeable portion, or a whole surface of the housing may be configured as a gas permeable portion, that is, the adsorbent is encapsulated by the gas permeable portion. According to embodiments of the present disclosure, the gas permeable portion can be formed of a gas permeable membrane, whereby the lyophobic property and gas permeable effect are good, and it is convenient to engage the gas permeable portion with other portions of the housing. In some specific examples of the present disclosure, referring to FIG. 2, the entire housing is formed of a gas permeable membrane, for example, a piece of gas permeable membrane may be folded and packaged to encapsulate the adsorbent. In other embodiments of the present disclosure, referring to FIG. 1, the housing may include a main housing member 1 defining an opening and a gas permeable portion 12 covering the opening. In still other embodiments of the present disclosure, referring to FIG. 5 and FIG. 6, the housing is formed by combining an electrolyte resistant material and a gas permeable membrane, specifically, the housing includes a first portion 13 formed of the electrolyte resistant material, and a second portion 14 formed of the gas permeable membrane.

According to embodiments of the present disclosure, the gas permeable membrane may have a thickness of 40 to 150 micrometers, for example, but is not limited to 40 micrometers, 45 micrometers, 50 micrometers, 55 micrometers, 60 micrometers, 65 micrometers, 70 micrometers, 75 micrometers, 80 micrometers, 85 micrometers, 90 micrometers, 95 micrometers, 100 micrometers, 105 micrometers, 110 micrometers, 115 micrometers, 120 micrometers, 125 micrometers, 130 micrometers, 135 micrometers, 140 micrometers, 145 micrometers, 150 micrometers. Thus, the adsorbent can be isolated from the external environment, and is prevented from being affected by the reagent existing in the external environment. The gas produced in the external environment can enter the interior of the housing and be effectively absorbed by the adsorbent. A too large thickness of the gas permeable membrane may waste an internal space of the battery and lower an energy density. A too small thickness results in a relatively small mechanical strength of the gas permeable membrane and a relatively decreased lyophobic ability. According to embodiments of the present disclosure, in order to further improve an isolation performance and a gas permeability of the gas permeable membrane, the gas permeable membrane satisfies at least one of the following conditions at a gas pressure of 7 KPa: an air flow rate is greater than or equal to 300 mL/min/cm$^2$; a hydrostatic pressure is greater than or equal to 90 KPa; an oleophobic level is greater than or equal to 7. The gas permeable membrane satisfying the above conditions has a better isolation performance and gas permeability.

According to embodiments of the present disclosure, the material for forming the gas permeable membrane includes at least one of a modified polytetrafluoroethylene and a modified polyethylene. In some specific embodiments of the present disclosure, the gas permeable membrane includes at least one of an expanded polytetrafluoroethylene microporous membrane and a stretched polyethylene microporous membrane. The expanded polytetrafluoroethylene microporous membrane and the stretched polyethylene microporous membrane have a network structure formed by a connection of fine fibers, and have a surface with a large number of minute pores, which can effectively ensure the isolation performance as well as good gas permeability.

According to embodiments of the present disclosure, a method of forming the housing may be a heat sealing method. Specifically, a position to be packaged may be heated to melt the housing material and then join the molten housing material together. Thus, the operation is simple, convenient, easy to control, mature in process, low in cost, and suitable for producing housings having various complicated shapes and structures. In some embodiments of the present disclosure, when the material for forming the housing has a high melting temperature, in order to lower an operating temperature of the heat sealing method and save energy, a surface of the gas permeable membrane (such as a surface to be packaged) may be provided with a hot melt adhesive layer. Thus, the hot melt adhesive can be melted at a lower temperature; the operating temperature is low, the energy consumption is low, and the safety is high. Specifically, specific types of the hot melt adhesives that can be used include, but are not limited to, polypropylene and the like. Thus, the bonding strength is high, the operating temperature is low, the material source is wide, and the cost is low.

According to embodiments of the present disclosure, the adsorbent used may be selected depending on a type of the produced gas to be adsorbed. When the adsorbent is applied to a battery, a main type of the produced gas inside the battery is at least one of carbon monoxide and carbon dioxide, and therefore the adsorbent is a molecular sieve capable of adsorbing carbon monoxide or carbon dioxide. Thus, the produced gas can be effectively adsorbed to prevent liquid leakage of the battery seal caused by breakage of the battery seal by gas, improving safety of the battery and extending lifetime of the battery. According to embodiments of the present disclosure, the adsorbent includes at least one selected from the group of a 5A calcium ion type molecular sieve, a lithium type molecular sieve, a 5× type molecular sieve, and a 13× type molecular sieve. Thus, carbon monoxide or carbon dioxide can be effectively adsorbed, improving reliability and safety of the battery and extending lifetime of the battery.

In another aspect of the disclosure, the disclosure provides a battery. According to embodiments of the present disclosure, referring to FIG. 7 to FIG. 11, the battery includes: a packaging film 4; a cell 5; the adsorption assembly 6 as described above, in which the adsorption assembly 6 is disposed on at least one side of the cell 5, the cell 5 and the adsorption assembly 6 are encapsulated by the packaging film 4. The inventors have found that the gas produced inside the battery can be effectively adsorbed to prevent liquid leakage of the battery seal caused by breakage of the battery seal by gas, obviously improving reliability and safety of the battery and extending lifetime of the battery. The battery has all the features and advantages of the adsorption assembly described above, and will not be repeated here.

According to embodiments of the present disclosure, as long as the adsorption assembly can effectively adsorb the gas produced inside the battery packaging film, the specific position inside of the packaging film, arrangement manner and the number of the adsorption assemblies can be flexibly selected by those skilled in the art, for example, on a surface of the cell, or at a gap between the cell and the packaging film. In some embodiments of the present disclosure, referring to FIG. 7 and FIG. 8, the adsorption assembly 6 is in a shape of a pocket, which is disposed on at least one surface of the cell 5, and specifically, can adhere to the surface of the cell 5 by an adhesive. In other embodiments of the present disclosure, referring to FIG. 9, the adsorption assembly 6 is in a shape of a rectangular parallelepiped disposed on one side of the cell 5. In some embodiments of the present disclosure, referring to FIG. 10, the adsorption assembly 6 is in a shape of a cylinder disposed on opposite sides of the cell 5. In still other embodiments of the present disclosure, referring to FIG. 11, the adsorption assembly 6 is in a shape of a curved column disposed on opposite sides of the cell 5. The above arrangement can make full use of the space inside the packaging film 4, which may increase an energy density of the battery, and the arrangement can make the produced gas be quickly adsorbed by the adsorption assembly to prevent liquid leakage of the battery seal caused by breakage of the battery seal by gas, which in turn affects reliability, safety and lifetime of the battery.

According to embodiments of the present disclosure, the material for forming the packaging film is not particularly limited and may be steel, aluminum, aluminum plastic or the like. Especially when the material for forming the packaging film is an aluminum plastic material, the reliability and safety of the battery can be greatly improved by providing the adsorption assembly, and the possibility of liquid leakage can be avoided. According to embodiments of the present disclosure, the specific shape of the packaging film is also not particularly limited, and may be various shapes of a conventional battery such as a rectangular parallelepiped, a cylinder, a cube, or the like.

Those skilled in the art will appreciate that in addition to the above described adsorption assembly or cell, the battery includes structures and components that are necessary for a conventional battery, for example, the battery may include an electrolyte, and necessary connection wires and the like.

Embodiments of the present disclosure are described in detail below.

Example 1

Figure 1:
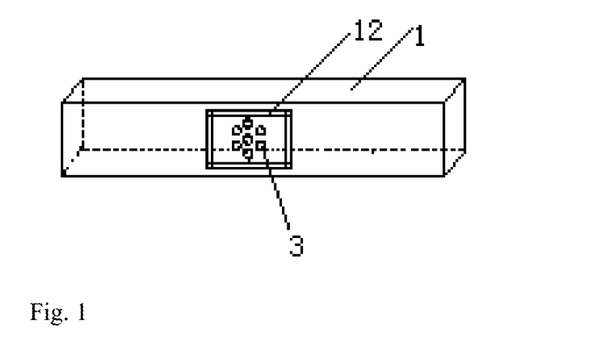
FIG. 1 is a schematic perspective view of an adsorption assembly according to an embodiment of the present disclosure.
Figure 12:
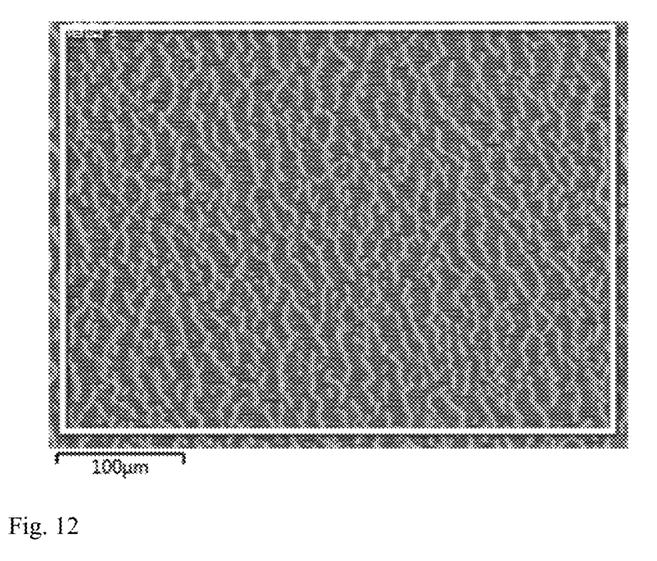
FIG. 12 is a scanning electron micrograph of a gas permeable membrane according to an embodiment of the present disclosure.
Figure 13:
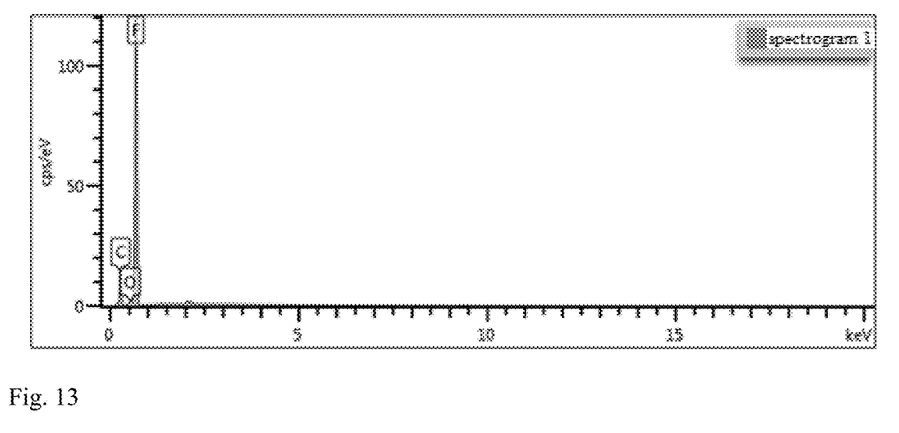
FIG. 13 is an energy spectrum spectrogram of a gas permeable membrane according to an embodiment of the present disclosure.

A 5A calcium ion type adsorbent (weight by electronic balance: 3.0 g) was packaged with a polytetrafluoroethylene microporous membrane (i.e., a gas permeable membrane, referring to FIG. 12 for a scanning electron micrograph and referring to FIG. 13 for an energy spectrum (EDS) spectrogram) with a lyophobic classification of 7 (a surface tension of 21 dyn/cm) and a thickness of 100 μm, and placed inside a battery (referring to FIG. 9) according to a structure shown in FIG. 1. The battery was internally evacuated and fully charged to 4.5V, and an expansion volume test for a produced gas was carried out in a thermostat at 80° C. The expansion volume of the produced gas was tested by a silicone oil removal method. The specific operation steps included: measuring a weight of the battery, and then storing the battery in silicone oil at 80° C. for 0.5 h and measuring an initial volume of the battery, and measuring a final volume of the battery after high temperature storage for 150 h. A final change of the volume of the battery was 2.34 cm$^3$. The electrolyte did not penetrate through the gas permeable membrane.

Example 2

A 5A calcium ion type adsorbent (weight by electronic balance: 3.0 g) was packaged with a polytetrafluoroethylene microporous membrane with a lyophobic classification of 7 (a surface tension of 21 dyn/cm) and a thickness of 25 nm, and placed inside a battery (referring to FIG. 9) according to a structure shown in FIG. 1. The battery was internally evacuated and fully charged to 4.5V, and the expansion volume test for a produced gas was carried out in a thermostat at 80° C. by a specific test method the same as that in the Example 1. A final change of the volume of the battery was 10.43 cm$^3$. The electrolyte completely penetrated through the gas permeable membrane and contacted with the adsorbent.

Example 3

A 5A calcium ion type adsorbent (weight by electronic balance: 3.0 g) was packaged with a polytetrafluoroethylene microporous membrane with a lyophobic classification of 7 (a surface tension of 21 dyn/cm) and a thickness of 40 nm, and placed inside a battery (referring to FIG. 9) according to a structure shown in FIG. 1. The battery was internally evacuated and fully charged to 4.5V, and the expansion volume test for a produced gas was carried out in a thermostat at 80° C. by a specific test method the same as that in the Example 1. A final change of the volume of the battery was 5.15 cm$^3$. The electrolyte slightly penetrated through the gas permeable membrane and contacted with the adsorbent.

Example 4

A 5A calcium ion type adsorbent (weight by electronic balance: 3.0 g) was packaged with a polytetrafluoroethylene microporous membrane with a lyophobic classification of 7 (a surface tension of 21 dyn/cm) and a thickness of 150 nm, and placed inside a battery (referring to FIG. 9) according to a structure shown in FIG. 1. The battery was internally evacuated and fully charged to 4.5V, and the expansion volume test for a produced gas was carried out in a thermostat at 80° C. by a specific test method the same as that in the Example 1. A final change of the volume of the battery was 5.31 cm$^3$. The electrolyte did not penetrate through the gas permeable membrane.

Example 5

A 5A calcium ion type adsorbent (weight by electronic balance: 3.0 g) was packaged with a polytetrafluoroethylene microporous membrane with a lyophobic classification of 5 (a surface tension of 24.5 dyn/cm) and a thickness of 100 and placed inside a battery (referring to FIG. 9) according to a structure shown in FIG. 1. The battery was internally evacuated and fully charged to 4.5V, and the expansion volume test for a produced gas was carried out in a thermostat at 80° C. by a specific test method the same as that in the Example 1. A final change of the volume of the battery was 8.01 cm$^3$. The electrolyte completely penetrated through the gas permeable membrane and the adsorbent was wetted by the electrolyte.

Example 6

A 13× type adsorbent (weight by electronic balance: 3.0 g) was packaged with a polytetrafluoroethylene microporous membrane with a thickness of 100 and placed inside a battery (referring to FIG. 9) according to a structure shown in FIG. 1. The battery was internally evacuated and fully charged to 4.5V, and the expansion volume test for a produced gas was carried out in a thermostat at 80° C. by a specific test method the same as that in the Example 1. A final change of the volume of the battery was 10.32 cm$^3$. The electrolyte did not penetrate through the gas permeable membrane.

Example 7

Figure 2:
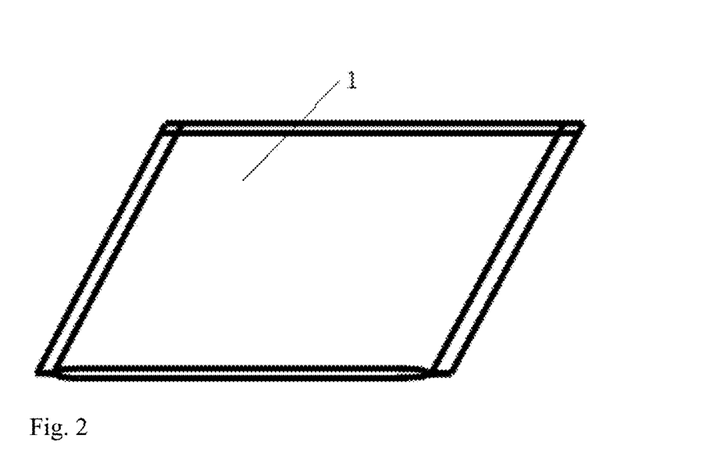
FIG. 2 is a schematic perspective view of an adsorption assembly according to another embodiment of the present disclosure.

A 5× type adsorbent (weight by electronic balance: 3.0 g) was packaged with a polytetrafluoroethylene microporous membrane with a thickness of 100 and placed inside a battery (referring to FIG. 7) according to a structure shown in FIG. 2. The battery was internally evacuated and fully charged to 4.5V, and the expansion volume test for a produced gas was carried out in a thermostat at 80° C. by a specific test method the same as that in the Example 1. A final change of the volume of the battery was 4.45 cm$^3$. The electrolyte did not penetrate through the gas permeable membrane.

Example 8

Figure 5:
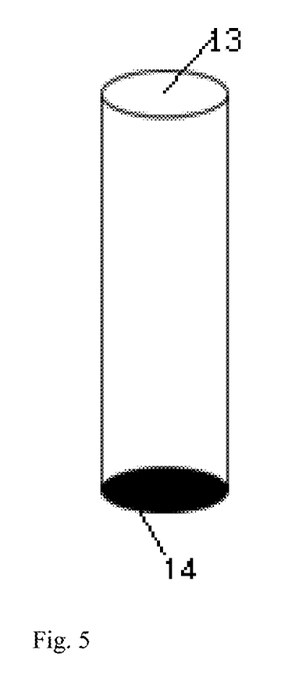
FIG. 5 is a schematic perspective view of an adsorption assembly according to another embodiment of the present disclosure.
Figure 6:
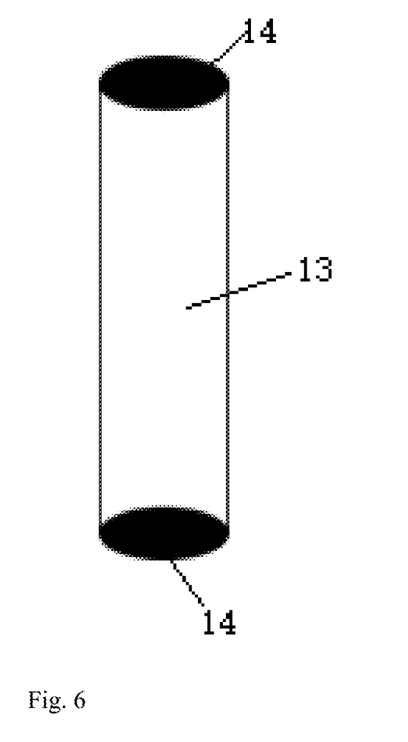
FIG. 6 is a schematic perspective view of an adsorption assembly according to another embodiment of the present disclosure.
Figure 7:
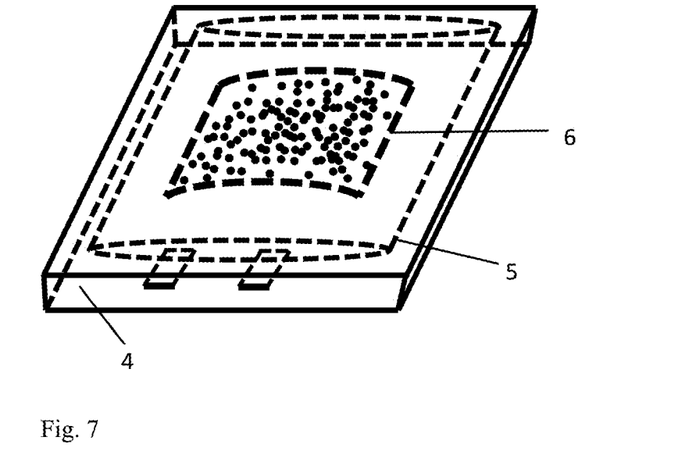
FIG. 7 is a schematic perspective view of a battery according to an embodiment of the present disclosure.
Figure 8:
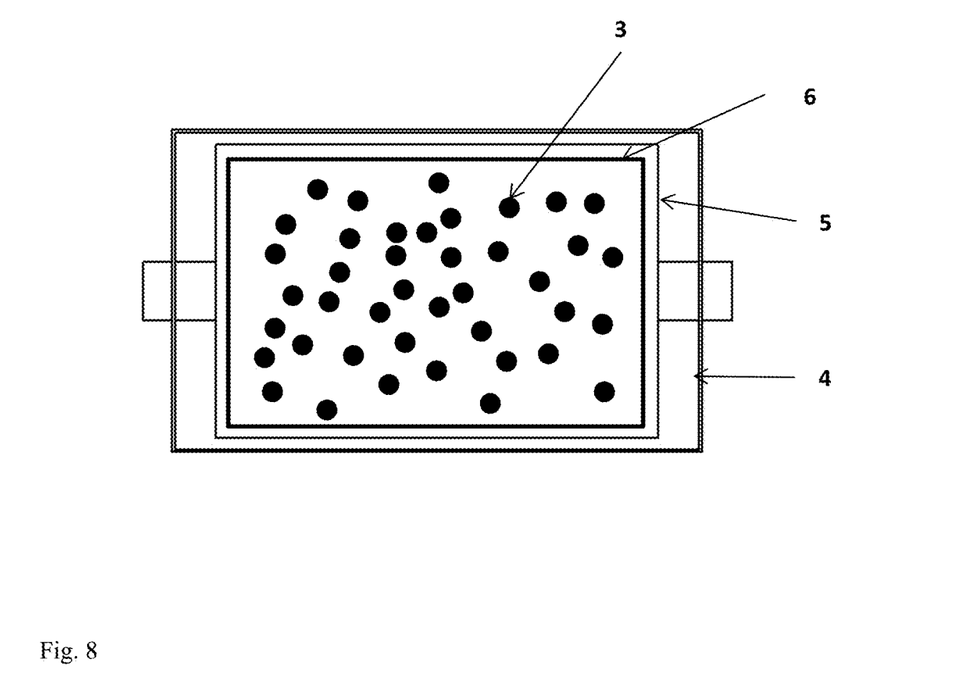
FIG. 8 is a schematic view of a battery according to another embodiment of the present disclosure.
Figure 9:
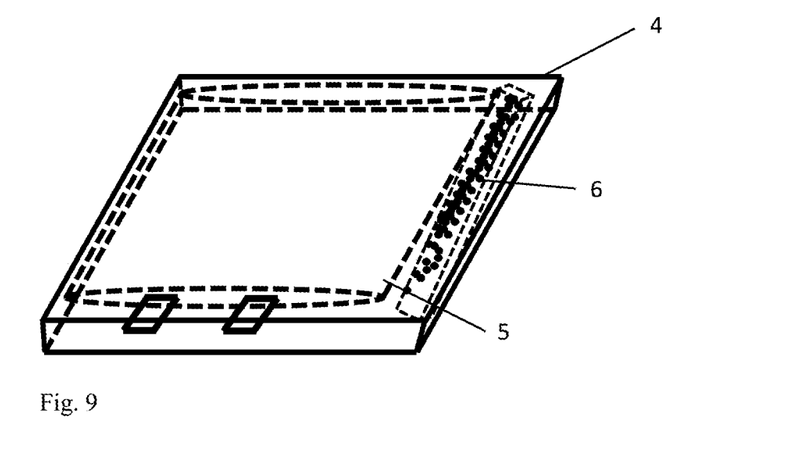
FIG. 9 is a schematic perspective view of a battery according to another embodiment of the present disclosure.
Figure 10:
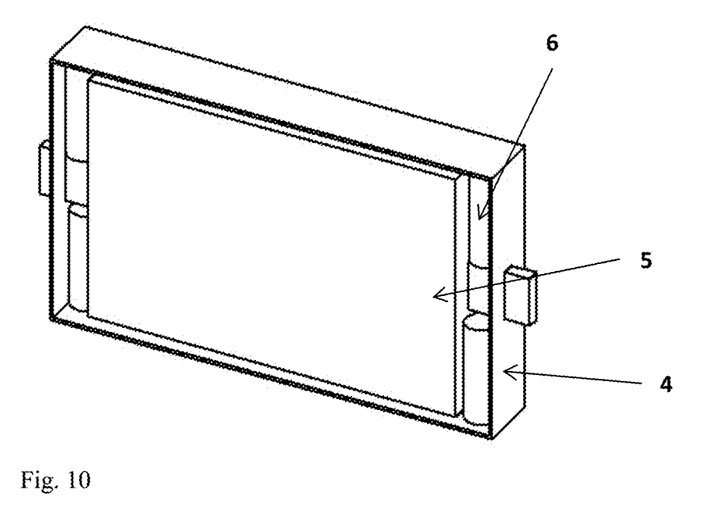
FIG. 10 is a schematic perspective view of a battery according to another embodiment of the present disclosure.
Figure 11:
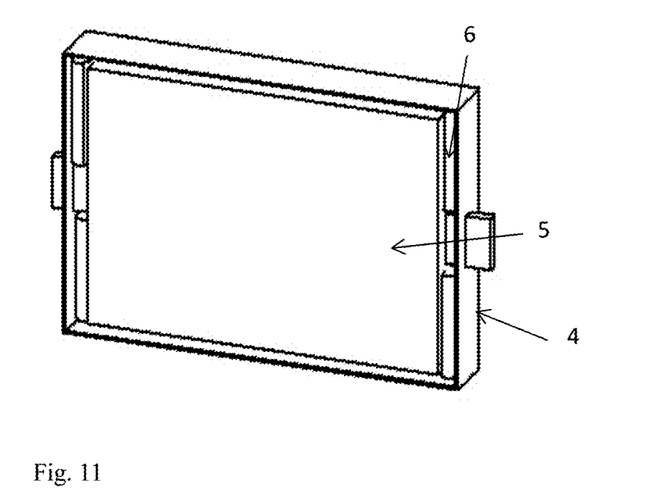
FIG. 11 is a schematic perspective view of a battery according to another embodiment of the present disclosure.

A 5× type adsorbent (weight by electronic balance: 3.0 g) was packaged with a polytetrafluoroethylene microporous membrane with a thickness of 100 μm and a polyethylene membrane with a thickness of 100 μm, and placed inside a battery (referring to FIG. 9, a difference is that the adsorption assembly is in a shape of cylinder) according to a structure shown in FIG. 5. The battery was internally evacuated and fully charged to 4.5V, and the expansion volume test for a produced gas was carried out in a thermostat at 80° C. by a specific test method the same as that in the Example 1. A final change of the volume of the battery was 2.98 cm$^3$. The electrolyte did not penetrate through the gas permeable membrane.

Example 9

A 5A calcium ion type adsorbent (weight by electronic balance: 3.0 g) was packaged with a polytetrafluoroethylene microporous membrane with a thickness of 60 μm, and placed inside a battery (referring to FIG. 9) according to a structure shown in FIG. 1. The battery was internally evacuated and fully charged to 4.5V, and the expansion volume test for a produced gas was carried out in a thermostat at 80° C. by a specific test method the same as that in the Example 1. A final change of the volume of the battery was 5.15 cm$^3$.

The electrolyte slightly penetrated through the gas permeable membrane and contacted with the adsorbent.

Example 10

A 13× type adsorbent (weight by electronic balance: 3.0 g) was packaged with a polytetrafluoroethylene microporous membrane with a thickness of 100 μm, and placed inside a battery (referring to FIG. 7) according to a structure shown in FIG. 2. The battery was internally evacuated and fully charged to 4.5V, and the expansion volume test for a produced gas was carried out in a thermostat at 80° C. by a specific test method is the same as that in the Example 1. A final change of the volume of the battery was 9.82 cm$^3$. The electrolyte did not penetrate through the gas permeable membrane.

Comparative Example 1

A battery is formed referring to Example 10 except that no adsorption assembly is arranged in the battery. The battery was internally evacuated and fully charged to 4.5V, and the expansion volume test for a produced gas was carried out in a thermostat at 80° C. by a specific test method the same as that in the Example 1. A final change of the volume of the battery was 12.73 cm$^3$. The electrolyte did not penetrate through the gas permeable membrane.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the schematic representation of the above terms throughout this specification are not necessarily referring to the same embodiment or example of the present disclosure. Furthermore, the particular features, structures, materials, or characteristics may be combined in any suitable manner in one or more embodiments or examples. In addition, without contradicting with each other, different embodiments or examples as well as features of various embodiments or examples may be integrate and combined.

Although explanatory embodiments have been shown and described above, it would be appreciated the above embodiments are explanatory and cannot be construed to limit the present disclosure, and changes, variations, alternatives, and modifications can be made in the embodiments by those skilled in the art in the scope of the present disclosure.

What is claimed is:

1. An adsorption assembly, comprising:
an adsorbent,
a housing forming a closed cavity for encapsulating the adsorbent,
wherein the closed cavity of the housing consists of a main housing member made of electrolyte resistant material and a gas permeable portion made of a gas permeable membrane and covering one and only one opening of the main housing member, external gas and internal gas of the adsorption assembly are exchanged only through the gas permeable portion; and
an outer surface of the gas permeable membrane is provided with an adhesive layer.

2. The adsorption assembly according to claim 1, wherein the electrolyte resistant material comprises at least one selected from the group of polyethylene, polypropylene and polyethylene terephthalate.

3. The adsorption assembly according to claim 1, wherein the adsorbent is encapsulated by the gas permeable portion.

4. The adsorption assembly according to claim 1, wherein the shape of the housing is at least one selected from the group of a prism, a cylinder, a curved column, and a pocket.

5. The adsorption assembly according to claim 1, wherein the thickness of the gas permeable membrane is between 40 and 150 microns.

6. The adsorption assembly according to claim 1, wherein the gas permeable membrane satisfies at least one of the following conditions at a gas pressure of 7 KPa:
an air flow rate is greater than or equal to 300 mL/min/cm$^2$;
a hydrostatic pressure is greater than or equal to 90 KPa;
an oleophobic level is greater than or equal to 7.

7. The adsorption assembly according to claim 1, wherein a material of the gas permeable membrane comprises at least one of a modified polytetrafluoroethylene and a modified polyethylene.

8. The adsorption assembly according to claim 1, wherein the gas permeable membrane comprises at least one of an expanded polytetrafluoroethylene microporous membrane and a stretched polyethylene microporous membrane.

9. The adsorption assembly according to claim 1, wherein the adsorbent comprises a molecular sieve capable of adsorbing carbon monoxide or carbon dioxide.

10. The adsorption assembly according to claim 9, wherein the adsorbent comprises at least one selected from the group of a 5A calcium ion type molecular sieve, a lithium type molecular sieve, a 5X type molecular sieve, and a 13X type molecular sieve.

11. A battery, comprising:
a packaging film;
a cell having a side surface;
an adsorption assembly having a pocket shape and including an adsorbent and a housing, the housing encapsulating the adsorbent, and the housing consists of a main housing member made of electrolyte resistant material and a gas permeable portion made of a gas permeable membrane and covering one and only one opening of the main housing member, external gas and internal gas of the adsorption assembly are exchanged only through the gas permeable portion;
wherein the adsorption assembly is disposed on at least one side of the cell, and the cell and the adsorption assembly are encapsulated by the packaging film;
an outer surface of the gas permeable membrane is provided with an adhesive layer; and
the adsorption assembly adheres to the side surface of the cell by the adhesive layer.

12. The battery according to claim 11, wherein the adsorbent is encapsulated by the gas permeable portion.

13. The battery according to claim 11, wherein the thickness of the gas permeable membrane is between 40 and 150 microns.

14. The battery according to claim 11, wherein the gas permeable membrane satisfies at least one of the following conditions at a gas pressure of 7 KPa:
an air flow rate is greater than or equal to 300 mL/min/cm$^2$;
a hydrostatic pressure is greater than or equal to 90 KPa;
an oleophobic level is greater than or equal to 7.

15. A battery, comprising an adsorption assembly, wherein the adsorption assembly includes:
an adsorbent,
a housing forming a closed cavity for encapsulating the adsorbent, wherein the closed cavity of the housing consists of a main housing member made of electrolyte resistant material and a gas permeable portion made of a gas permeable membrane and covering one and only one opening of the main housing member, external gas and internal gas of the adsorption assembly are exchanged only through the gas permeable portion; and an outer surface of the gas permeable membrane is provided with an adhesive layer.

* * * * *